(12) United States Patent
Cheiky et al.

(10) Patent No.: US 9,403,140 B2
(45) Date of Patent: *Aug. 2, 2016

(54) SYSTEM FOR MAKING RENEWABLE FUELS

(71) Applicant: Cool Planet Energy Systems, Inc., Greenwood Village, CO (US)

(72) Inventors: Michael C. Cheiky, Thousand Oaks, CA (US); Rajashekharam Malyala, Camarillo, CA (US)

(73) Assignee: Cool Planet Energy Systems, Inc., Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,348

(22) Filed: Feb. 10, 2015

(65) Prior Publication Data

US 2015/0158006 A1  Jun. 11, 2015

Related U.S. Application Data

(63) Continuation of application No. 13/752,278, filed on Jan. 28, 2013, now Pat. No. 8,951,476, which is a continuation-in-part of application No. 13/361,828, filed on Jan. 30, 2012, now Pat. No. 8,383,049, which is a continuation of application No. 13/071,038, filed on Mar. 24, 2011, now Pat. No. 8,137,628.

(51) Int. Cl.
*B01J 19/00* (2006.01)
*B01J 19/24* (2006.01)
(Continued)

(52) U.S. Cl.
CPC ............ *B01J 19/0013* (2013.01); *B01J 19/245* (2013.01); *C10G 1/002* (2013.01);
(Continued)

(58) Field of Classification Search
CPC .... B01J 19/00; B01J 19/0006; B01J 19/0013; B01J 19/24; B01J 19/245; B01J 2219/00049; B01J 2219/00051; B01J 2219/24; C10G 1/00; C10G 1/002; C10G 2/00–2/33; C10G 45/00; C10G 49/00; C10G 49/002; C10G 65/00; C10G 65/02; C10G 67/00; C10G 67/02; C10G 2300/00; C10G 2300/10; C10G 2300/1022; C10G 2400/02; C10G 2400/04; C10G 2400/08; C10G 49/02; C07C 1/00; Y02P 30/00; Y02P 30/20
See application file for complete search history.

(56) References Cited

U.S. PATENT DOCUMENTS 203,016 A    4/1878  Edison
222,390 A   12/1879  Edison (Continued)

FOREIGN PATENT DOCUMENTS

KR      100819505        4/2008
WO   WO-2009004652 A1    1/2009
WO   WO-2011067552 A1    6/2011

OTHER PUBLICATIONS

Buerschaper, R., "Thermal & Electrical Conductivity of Graphite & Carbon at Low Temperatures," Journal of Applied Physics, pp. 452-454 (1994).

(Continued)

*Primary Examiner* — Natasha Young
(74) *Attorney, Agent, or Firm* — Wilmer Cutler Pickering Hale and Dorr LLP

(57) ABSTRACT

Multiple catalytic processing stations couple with a system which produces volatile gas streams from biomass decomposition at discrete increasing temperatures. These catalytic processing stations can be programmed to maximize conversion of biomass to useful renewable fuel components based on input feedstock and desired outputs.

28 Claims, 11 Drawing Sheets

(51) Int. Cl.
| | |
|---|---|
| *C07C 1/00* | (2006.01) |
| *C10G 1/00* | (2006.01) |
| *C10G 1/02* | (2006.01) |
| *C10G 45/00* | (2006.01) |
| *C10G 49/00* | (2006.01) |
| *C10G 49/02* | (2006.01) |
| *C10G 65/00* | (2006.01) |
| *C10G 65/02* | (2006.01) |
| *C10G 67/00* | (2006.01) |
| *C10G 67/02* | (2006.01) |
| *C10G 2/00* | (2006.01) |
| *G05D 7/06* | (2006.01) |
| *C10G 65/04* | (2006.01) |

(52) U.S. Cl.
CPC .............. *C10G 2/32* (2013.01); *C10G 65/046* (2013.01); *C10G 67/02* (2013.01); *G05D 7/0623* (2013.01); *B01J 2219/00051* (2013.01); *B01J 2219/24* (2013.01); *C10G 2300/1011* (2013.01); *C10G 2400/02* (2013.01); *C10G 2400/04* (2013.01); *C10G 2400/08* (2013.01); *Y02P 30/20* (2015.11)

(56) References Cited

U.S. PATENT DOCUMENTS

| | | |
|---|---|---|
| 474,230 A | 5/1892 | Edison |
| 2,162,838 A | 6/1939 | Cole et al. |
| 3,142,545 A | 7/1964 | Peery et al. |
| 4,268,275 A | 5/1981 | Chittick |
| 4,421,524 A | 12/1983 | Chittick |
| 4,487,958 A | 12/1984 | Ream et al. |
| 4,497,637 A | 2/1985 | Purdy et al. |
| 4,530,702 A | 7/1985 | Fetters et al. |
| 4,536,584 A | 8/1985 | Eskamani et al. |
| 4,861,351 A | 8/1989 | Nicholas et al. |
| 4,992,480 A | 2/1991 | Mahajan et al. |
| 5,032,618 A | 7/1991 | Marchionna et al. |
| 5,087,786 A | 2/1992 | Nubel et al. |
| 5,114,541 A | 5/1992 | Bayer |
| 5,221,290 A | 6/1993 | Dell |
| 5,504,259 A | 4/1996 | Diebold et al. |
| 5,756,194 A | 5/1998 | Shogren et al. |
| 5,820,640 A | 10/1998 | Ikura et al. |
| 5,857,807 A | 1/1999 | Longo, Sr. |
| 5,905,094 A | 5/1999 | Chang et al. |
| 6,133,328 A | 10/2000 | Lightner |
| 6,227,473 B1 | 5/2001 | Arnold |
| 6,339,031 B1 | 1/2002 | Tan |
| 6,376,731 B1 | 4/2002 | Evans et al. |
| 6,458,856 B1 | 10/2002 | Peng et al. |
| 6,548,026 B1 | 4/2003 | Dales et al. |
| 6,747,067 B2 | 6/2004 | Melnichuk et al. |
| 6,811,703 B2 | 11/2004 | Elliott |
| 6,841,085 B2 | 1/2005 | Werpy et al. |
| 6,923,838 B2 | 8/2005 | Maubert et al. |
| 6,994,827 B2 | 2/2006 | Safir et al. |
| 7,033,972 B2 | 4/2006 | Shikada et al. |
| 7,226,566 B2 | 6/2007 | Beierle |
| 7,438,785 B2 | 10/2008 | Meier et al. |
| 7,458,999 B2 | 12/2008 | Schenck et al. |
| 7,748,653 B2 | 7/2010 | Palm |
| 7,820,867 B2 | 10/2010 | Joensen et al. |
| 7,846,979 B2 | 12/2010 | Rojey et al. |
| 7,857,943 B2 | 12/2010 | Noto |
| 7,888,540 B2 | 2/2011 | Deluga et al. |
| 7,910,630 B2 | 3/2011 | Rostrup-Nielsen et al. |
| 8,137,628 B2 | 3/2012 | Cheiky et al. |
| 8,143,464 B2 | 3/2012 | Cheiky et al. |
| 8,216,430 B2 | 7/2012 | Cheiky |
| 8,293,958 B2 | 10/2012 | Cheiky |
| 8,367,881 B2 | 2/2013 | Cheiky et al. |
| 8,383,049 B2 | 2/2013 | Cheiky et al. |
| 8,951,476 B2 | 2/2015 | Cheiky et al. |
| 2003/0119952 A1 | 6/2003 | Werpy et al. |
| 2004/0111968 A1 | 6/2004 | Day et al. |
| 2008/0006519 A1 | 1/2008 | Badger |
| 2008/0093209 A1 | 4/2008 | Noto |
| 2008/0182912 A1 | 7/2008 | Van Den Berg et al. |
| 2008/0216391 A1 | 9/2008 | Cortright et al. |
| 2008/0223269 A1 | 9/2008 | Paoluccio |
| 2008/0300435 A1 | 12/2008 | Cortright et al. |
| 2008/0317657 A1 | 12/2008 | Hall et al. |
| 2009/0007484 A1 | 1/2009 | Smith |
| 2009/0031615 A1 | 2/2009 | Joshi et al. |
| 2009/0139139 A1 | 6/2009 | Tilman et al. |
| 2009/0151251 A1 | 6/2009 | Manzer et al. |
| 2009/0183430 A1 | 7/2009 | Schubert et al. |
| 2009/0183431 A1 | 7/2009 | Smit et al. |
| 2009/0217575 A1 | 9/2009 | Raman et al. |
| 2009/0253947 A1 | 10/2009 | Brandvold et al. |
| 2009/0308787 A1 | 12/2009 | O'Connor et al. |
| 2010/0036181 A1 | 2/2010 | Diebold et al. |
| 2010/0040510 A1 | 2/2010 | Randhava et al. |
| 2010/0101141 A1 | 4/2010 | Shulenberger et al. |
| 2010/0162780 A1 | 7/2010 | Scharf |
| 2010/0180805 A1 | 7/2010 | Cheiky |
| 2010/0218417 A1 | 9/2010 | Bauldreay et al. |
| 2010/0223839 A1 | 9/2010 | Garcia-Perez et al. |
| 2010/0257775 A1 | 10/2010 | Cheiky |
| 2010/0270505 A1 | 10/2010 | Gallaspy et al. |
| 2010/0300866 A1 | 12/2010 | van Aardt et al. |
| 2010/0305220 A1 | 12/2010 | Kukkonen et al. |
| 2011/0023566 A1 | 2/2011 | Lodwig et al. |
| 2011/0047864 A1 | 3/2011 | Bhan et al. |
| 2011/0098367 A1 | 4/2011 | Assink et al. |
| 2011/0177466 A1 | 7/2011 | Cheiky |
| 2011/0212004 A1 | 9/2011 | Cheiky et al. |
| 2012/0152801 A1 | 6/2012 | Bozzano et al. |
| 2012/0238787 A1 | 9/2012 | Gruber et al. |
| 2013/0247448 A1 | 9/2013 | Ampulski et al. |
| 2014/0301934 A1 | 10/2014 | Tucker |
| 2015/0073188 A1 | 3/2015 | Floudas et al. |

OTHER PUBLICATIONS

Cheng, C., "Stability of Black Carbon in Soils Across a Climatic Gradient," Journal of Geophysical Research Biogeosciences, vol. 113, No. G02027, pp. 1-10 (2008).

Chew, T. L., "Catalytic Processes Towards the Production of Biofuels in a Palm Oil and Oil Palm Biomass-based Biorefinery," Biorefinery, Bioresource Technology, vol. 99, pp. 7911-8922 (2008).

Demirbas, "Effects of Temperature & Particle Size on Bio-Char Yield from Pyrolysis of Agriculture Residues," Journal of Anal. Pyrolysis, vol. 72, pp. 243-348 (2006).

Dinesh, M., "Pyrolysis of Wood/Biomass for Bio-Oil: A Critical Review," Energy & Fuels, vol. 20, pp. 848-889 (2006).

Elliott, D.C., "Liquid Fuels by Low-Severity Hydrotreating of Biocrude," Dev. in Thermochemical Biomass Conversion, vol. 1, pp. 611-621 (1996).

Faludi, J., "World Changing Change Your Thinking a Carbon-Negative Fuel," retrieved from the internet URL:<www.worldchanging.com> (Oct. 16, 2007) 4 pgs.

Gehrer, E. et al., "A fully programmable system for the study of catalytic gas reactions," Journal of Physics Educations: Scientific Instruments, vol. 18, Issue 10, pp. 836-838 (1985).

International Search Report and Written Opinion Issued by the U.S. Patent and Trademark Office as International Searching Authority for International Application No. PCT/US13/56037 mailed Mar. 6, 2014 (18 pgs.).

International Search Report and Written Opinion Issued by the U.S. Patent and Trademark Office as International Searching Authority for International Application No. PCT/US2014/013345 mailed May 9, 2014 (11 pgs.).

Kim et al., "Characteristics of Crosslinked Potato Starch & Starch-Filled Linear Low-Density Polyethylene Films," Carbohydrate Polymers, vol. 50, pp. 331-337 (2002).

Laird, D., "The Charcoal Vision: A Win Win Scenario," Agron. Journal, vol. 100, No. 1, pp. 178-181 (2008).

(56) References Cited

OTHER PUBLICATIONS

Lehmann, J., "Nutrient Available & Leaching in an Archaeological Anthrosol & Ferraisol of the Central Amazon Basin: Fertilizer, Manure," Plant Soil, vol. 249, pp. 343-357 (2003).

Lima, I. M., "Physiochemical & Adsorption Properties of Fast-Pyrolysis Bio-Chars & their Steam Activated Counterparts," J. Chem. Biotechnical, vol. 85, pp. 1515-1521 (2010).

Mohan, D., "Pyrolysis of Wood/Biomass for Bio-Oil: A Critical Review," Energy & Fuels, vol. 20, pp. 848-889 (2006).

Norman, et al., "Best Management Practices for Reclaiming Surface Mines in Washington and Oregon," Open-File Report 0-92-2, revised edition, retrieved from the internet URL<www.oregongeology.org.2/9/10> (Dec. 1997) 128 pgs.

Ogawa, Carbon Sequestration by Carbonization of Biomass & Forestation, 3 Case Studies, Mitigation & Adaption Strategies for Global Change, vol. 11, pp. 429-444 (2006).

Omata, K., "Optimization of Cu Oxide Catalyst for Methanol Synthesis under High CO2 Partial Pressure Using Combinatorial Tools," App. Catalyst A: General, vol. 262, pp. 207-214 (2004).

Preston, C.M., "(Pyrogenic) Carbon: a Synthesis of Current Knowledge & Uncertainties with Special Consideration of Boreal Regions," Biogeosciences, vol. 3, pp. 397-420 (2006).

Ramesh, K. S., "Catalytic Upgrading of Pyrolysis Oil," Energy & Fuels, vol. 7, pp. 306-314 (1993).

Rosenberg, Z., "More on Commercial Carbon Resistors as Low Pressure Gauges," International Journal of Impat. Engineering, vol. 34, pp. 732-742 (2007).

Sharma, Ramesh K. and Bakhshi, Narendra N., "Catalytic Upgrading of Pyrolysis Oil," Energy & Fuels, vol. 7, pp. 306-314 (No Month Listed 1993).

Takeishi, K., "Dimethyl Ether & Catalyst Development for Production of Syngas," Biofuels, vol. 1, No. 1, pp. 217-226 (2010).

Tryon, E.H., "Effect of Charcoal on Certain Physical, Chemical, & Biological Properties of Forest Coils," Ecological Monographs, vol. 18, No. 1, pp. 81-115 (Jan. 1948).

SYSTEM FOR MAKING RENEWABLE FUELS

REFERENCE TO RELATED APPLICATIONS

This application is a continuation of U.S. patent application Ser. No. 13/752,278, filed Jan. 28, 2013 (now U.S. Pat. No. 8,951,476), which is a continuation-in-part of U.S. patent application Ser. No. 13/361,828, filed Jan. 30, 2012 (now U.S. Pat. No. 8,383,049), which is a continuation of U.S. patent application Ser. No. 13/071,038, filed Mar. 24, 2011 (now U.S. Pat. No. 8,137,628), all of which are incorporated herein by reference in their entirety.

TECHNICAL FIELD

The present invention relates generally to systems for making renewable fuels, and more particularly to the thermal chemical conversion of biomass to renewable fuels and other useful chemical compounds, including gasoline and diesel, via a series of catalysts using a programmable system.

DESCRIPTION OF THE RELATED ART

As the world continues to run through its precious resources of fossil fuels, it is going to be forced to turn to other sources of energy. Present global objectives include getting energy cheaply and quickly. Through the ages, mankind has turned to biomass to furnish energy in terms of heat by burning wood and other biomass. This is inherently a very inefficient process. Combustion may be made more efficient by introducing programmability. It is similar to introducing computers to a building that needs to be heated. In order to heat the building only when the person is present, one places a sensor in the building so that the heater turns on when the sensor detects a person. This is an example of a programmable system. Similarly, a programmable system may be introduced for chemical bond breakage resulting in efficient conversion of biomass to higher value added products, wherein only the minimum number of bonds are broken and, consequently, the minimum amount of energy is spent breaking these bonds.

Bond breaking and making are essential aspects of conversion of biomass to industrially useful products such as gasoline and diesel. Various forms of laboratory and small scale commercial biomass pyrolyzers have been developed to generate useful chemical products from the controlled pyrolysis of biomaterials ranging from wood chips to sewage sludge. Although some pyrolyzers are focused simply on producing syngas (also sometimes know as synthesis gas), there is considerable effort in the development of milder pyrolyzing conditions, which typically results in a condensed liquid commonly called bio-oil or pyrolysis oil. Many forms of pyrolyzers have been developed at the laboratory level to produce these intermediate compounds, which are collectively referred to as bio-oil or pyrolysis oil. Configurations include simple tube furnaces where the biomass is roasted in ceramic boats, ablative pyrolyzers where wood is rubbed against a hot surface, various forms of fluidized bed pyrolyzers where biomass is mixed with hot sand, and various simpler configurations that are based on earlier coking oven designs.

The fundamental problem with the resultant pyrolysis oil is that it is made up of hundreds to thousands of compounds, which are the result of subjecting the raw biomass to a wide range of temperature, time, and pressure profiles in bulk. When this process is complicated by the thousands of major bio-compounds in the original bio-feedstock, the result is a nearly intractable array of resultant compounds all mixed together. Pyrolysis oils from such processes are typically not thermodynamically stable. They contain active oxygenated free radicals that are catalyzed by organic acids and bases such that these oils typically evolve over a period of a few days from light colored liquids to dark mixtures with tar and resinous substances entrained in the mix. Also, attempts to re-gasify pyrolysis oil typically result in additional chemical reactions, which produce additional biochar and a shift to lower molecular weight components in the resulting gas stream. Although fairly high yields of pyrolysis oil can be achieved in laboratory scale experiments, larger industrial scale demonstration projects typically produce much lower yield. This is presumably due to the wider range of temperatures, hold times, and localized pressures within the much larger heated three dimensional volumes of such scale-up architectures.

Previous efforts to introduce a programmable adaptability to catalytic systems include Gehrer's design of building several parallel reactors, in analogy to a microprocessor bus, to study catalytic gas reactions. (Journal of Physics E: Scientific Instruments 18 (1985) 836). U.S. Pat. No. 6,548,026 by Dales et al. and U.S. Pat. No. 6,994,827 by Safir et. al. disclose programmable parallel reactors capable of controlling vessel stirring rate, temperature and pressure. Additionally, U.S. Patent Application 2010/0223839 to Garcia-Perez et al. discloses heating biomass to a first temperature aimed to enhance the subsequent anhydro sugar content developed in the oil portion of the biomass pyrolysis product. The aim is to enhance the fermentation capability of the oil portion for subsequent ethanol production. This is an example of a somewhat programmable system for biomass conversion.

BRIEF SUMMARY OF EMBODIMENTS OF THE INVENTION

Embodiments of the present invention provide a system and method for the conversion of biomass to renewable fuels. By renewable fuel is meant any combustible fuel that is derived from biomass and that is useful for transportation or other purposes, including such fuels as gasoline, diesel, jet fuel, or other useful fuel blends (such as a blend of benzene, toluene and xylene (BTX))). In one embodiment, the system comprises a device containing a programmable number of processing stations (N) and an array of catalysts; a means for subjecting biomass within these stations to programmable temperatures (Tstart); a means for incrementing individual processing station temperatures by programmable increments (ΔT) to produce a volatile and non-volatile component; a means for incrementing the non-volatile component temperature by ΔT to further produce additional volatile and non-volatile components; and a means for subjecting the volatile components generated in each station through a series of catalysts selected from the group dehydration catalysts, aromatization catalysts, and gas-upgrading catalysts to produce at least one renewable fuel.

Some embodiments of the invention involve a system and method for creating a programmable process wherein chemical compounds from biomass decomposition are routed to distinct catalyst chains to produce products containing renewable fuels and other value added products.

Further embodiments of this invention are directed toward an efficient system for the conversion of biomass pyrolysis products.

Additional embodiments are directed toward a process for extracting the maximum amount of energy from biomass for the conversion to gasoline or diesel that depends on the temperature of devolatilization of the biomass.

Yet another embodiment of this invention involves a process for extracting the maximum amount of energy from biomass for the conversion to gasoline or diesel that depends on load balancing a catalyst output at certain temperatures.

Some embodiments of this invention are directed to systems for the conversion of biomass to renewable fuel, comprising: a programmable number of processing stations (N) for subjecting biomass to at least one programmable starting temperature (Tstart) and for incrementing the temperature by programmable increments ($\Delta T$) to produce a volatile and a non-volatile component; a series of catalyst columns; means for subjecting the volatile components generated in each station through the series of catalyst columns to produce at least one renewable fuel; a hydrotreating catalyst; and means for subjecting at least one renewable fuel to the hydrotreating catalyst to produce at least one hydrotreated renewable fuel.

Some embodiments of this invention are directed to systems for the conversion of biomass to renewable fuel, comprising: a programmable number of processing stations (N) for subjecting biomass to at least one programmable starting temperature (Tstart) and for incrementing the temperature by programmable increments ($\Delta T$) to produce a volatile and a non-volatile component; a series of catalyst columns; means for subjecting the volatile components generated in each station through the series of catalyst columns to produce at least one renewable fuel; a syngas conversion catalyst; and a methanol/dimethyl ether synthesis catalyst; wherein a co-solvent is added to volatile components or added to at least one of the processing stations, wherein the co-solvent is selected from the group consisting of alcohols, aldehydes, ketones, ethers, carboxylic acids, and hydrocarbons, and wherein the co-solvent is generated via treatment of the non-volatile component with the syngas conversion catalyst to generate syngas and subsequent treatment of a portion of the syngas with the methanol/dimethyl ether synthesis catalyst.

Some embodiments of this invention are directed to systems for the conversion of biomass to renewable fuel, comprising: a programmable number of processing stations (N) for subjecting biomass to at least one programmable starting temperature (Tstart) and for incrementing the temperature by programmable increments ($\Delta T$) to produce a volatile and a non-volatile component; a series of catalyst columns; means for subjecting the volatile components generated in each station through the series of catalyst columns to produce at least one renewable fuel; a syngas conversion catalyst; and a Fischer-Tropsch catalyst; wherein the syngas conversion catalyst is used to convert a portion of the non-volatile component to syngas, and wherein a portion of the resulting syngas is subjected to the Fischer-Tropsch catalyst to generate synthetic paraffinic kerosene.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a programmable system for routing biomass decomposition products through a system comprised of processing stations and a series of catalysts. It realizes a programmable system for maximizing output from a pyrolysis system. There are three basic approaches in this programmable system: a) routing based on knowledge of the initial composition of the biomass, b) routing based on knowledge of the temperature of biomass devolatilization, and c) routing based on load balancing. The full nature of these approaches will now be described by reference to the figures.

Methods of introducing biomass into a processing station include introduction via conveyor belts, hoppers, and/or pulverizers. The pyrolyzer described herein may include these components enveloped in one system, where, for example, the pulverization and pyrolysis components are intimately connected. Biomass may be introduced in raw form or dry form, or may be dried within the pyrolysis chamber when the pyrolysis starts.

As used herein, the term 'biomass' includes any material derived or readily obtained from plant sources. Such material can include without limitation: (i) plant products such as bark, leaves, tree branches, tree stumps, hardwood chips, softwood chips, grape pumice, sugarcane bagasse, switchgrass; and (ii) pellet material such as grass, wood and hay pellets, crop products such as corn, wheat and kenaf. This term may also include seeds such as vegetable seeds, fruit seeds, and legume seeds.

The term 'biomass' can also include: (i) waste products including animal manure such as poultry derived waste; (ii) commercial or recycled material including plastic, paper, paper pulp, cardboard, sawdust, timber residue, wood shavings and cloth; (iii) municipal waste including sewage waste; (iv) agricultural waste such as coconut shells, pecan shells, almond shells, coffee grounds; and (v) agricultural feed products such as rice straw, wheat straw, rice hulls, corn stover, corn straw, and corn cobs.

Figure 1:
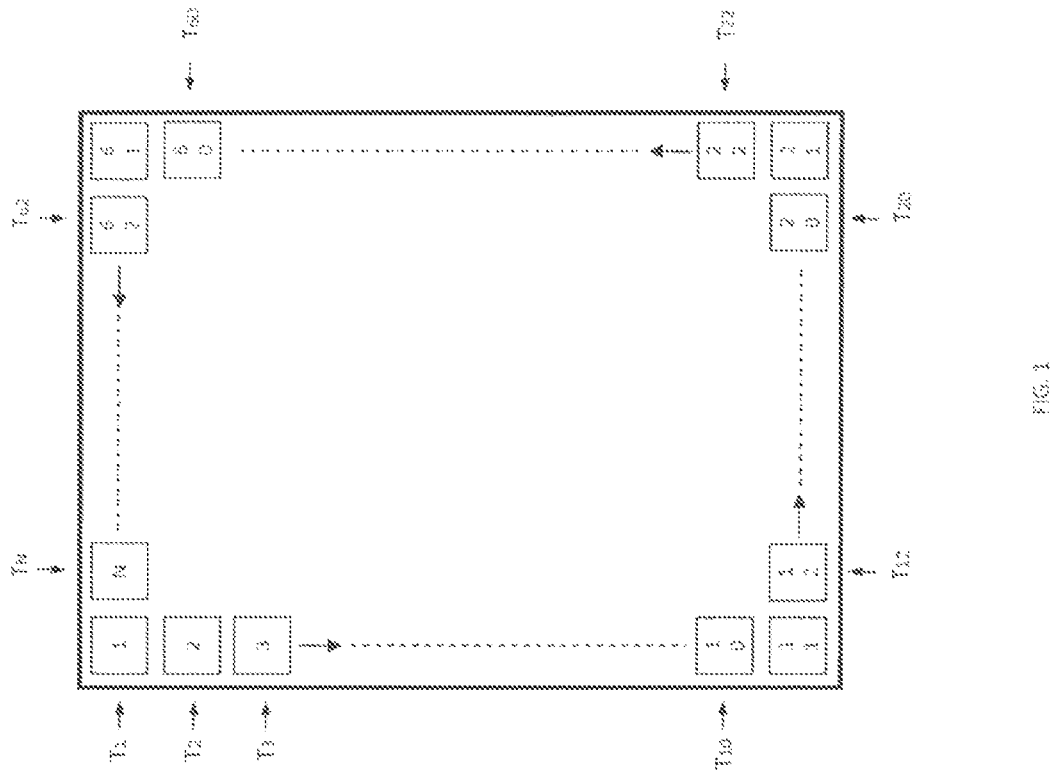
FIG. 1 is a drawing illustrating N processing stations on a race track, wherein each processing station is operating at a particular temperature.

Referring to FIG. 1, a series of N processing stations 50 are arranged around a rectangular track 52 sequentially. A processing station 50 may comprise any of a number of well-known pyrolysis reactors, including fixed bed reactors, fluidized bed reactors, circulating bed reactors, bubbling fluid bed reactors, vacuum moving bed reactors, entrained flow reactors, cyclonic or vortex reactors, rotating cone reactors, auger reactors, ablative reactors, microwave or plasma assisted pyrolysis reactors, and vacuum moving bed reactors. It may also comprise a chamber in a biomass fractionating system as described in co-owned U.S. Patent Publication No. 2010/0180805, the content of which is incorporated herein by reference in its entirety.

At any one time, each processing station 50 is operated at a certain temperature (marked next to each processing station in FIG. 1 as $T_1 \ldots T_N$). Thus, the Nth station is operated at temperature $T_N$. The first processing station is Station 1. Each processing station 50 can be dialed to any temperature that is equal to or higher than the previous processing station. The starting processing station temperature is typically determined by the initial composition of the biomass. The device accommodates a total of N processing stations, where N is operator adjustable from 2 to 1000, preferably between 2 and 100, and most preferably between 2 and 50. A station temperature can be incremented by a variable increment $\Delta T$, which can be in the range of 0° C. to 200° C. In one embodiment, all processing stations 50 operate at the same temperature. In another embodiment, each subsequent processing station temperature is incrementally higher by $\Delta T$ from the previous processing station. In still another embodiment, a group of adjacent processing stations are operated at the same temperature T, followed by another group of adjacent processing stations which are operated at temperature $T+x*\Delta T$, followed still by another group of processing stations operating at temperature $T+y*\Delta T$, where x and y are any numbers greater or equal to 1.

The processing stations 50 produce volatile and non-volatile components when heated. Because the material can be heated within a relatively narrow temperature range, the non-volatile component (in the form of partially formed char) has additional volatile components embedded therein, which are extractable and processed in subsequent processing stations. The output of these processing stations is connected to an array of catalysts as described below.

Biomass is typically comprised of a wide array of compounds classified within the categories of cellulose, hemicelluloses, lignin, starches, and lipids. These compounds go through multiple steps of decomposition when subject to the pyrolysis process. For example, hemicelluloses comprise C5 sugars such as fructose and xylose, which yield furfural and hydroxymethylfurfurals upon thermolysis. The latter compounds can be further converted to fuel intermediates furan and tetrahydrofuran. The relatively narrow temperature windows experienced within a processing station 50 allows for the collection of these useful intermediates.

Figure 2:
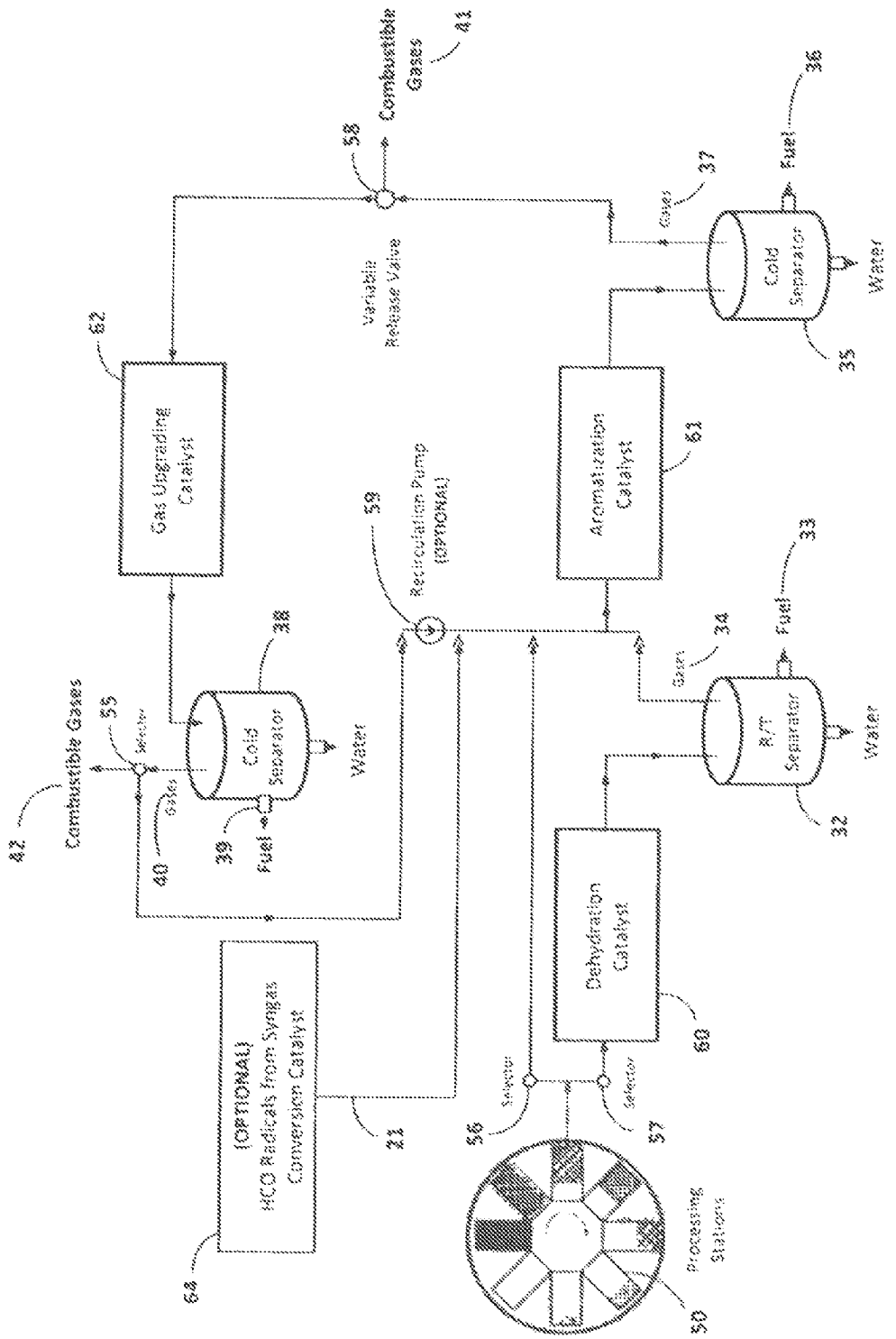
FIG. 2 is a flow diagram illustrating a programmable catalyst chain with three stations, in accordance with the principles of the invention.

FIG. 2 depicts an embodiment of the present invention having eight processing stations 50 and a series of catalyst channels comprising a dehydration catalyst 60, an aromatization catalyst 61 and a gas-upgrading catalyst 62. The output from each catalytic array when cooled is comprised of volatile gases, renewable fuel and water. The volatile gases are then programmed to pass through subsequent catalytic columns. Depending on the temperature of the processing station 50 and the biomass composition, the volatile components from any given processing station can be channeled through one or more catalysts 60, 61, 62 using selector switches 55, 56, 57. Line 21 shows that an optional co-solvent may be added as an additional input to the aromatization catalyst 61. The co-solvent may be generated from a typical syngas converter 64. Carbon monoxide and hydrogen for the syngas converter (to generate the co-solvent) may be obtained via well-known reactions with the left-over carbonaceous solid in a processing station 50. The co-solvent may comprise oxygenates such as aldehydes, alcohols, ketones, ethers, and carboxylates, as well as hydrocarbons.

If the volatile components from the processing station 50 are selected to go through a dehydration catalyst 60, then the output is passed through a room temperature separator 32, which separates the output into water, renewable fuel 33, and volatile gases 34. The volatile gases are then routed through the aromatization catalyst 61 to produce a product that upon cooling with cold separator 35 gives water, renewable fuel 36 and volatile gases 37, which may include combustible gases 41. These combustible gases can then be released via a variable release valve 58. The variable release valve can control the routing of the volatile gases 37 to either a gas-upgrading catalyst chamber, or a combustible gas treatment plant, or both. Upon cooling via cold separator 38, the product from the gas-upgrading catalyst 62 produces water, renewable fuel 39 and volatile gases 40, which may include combustible gas mixture 42. This combustible gas mixture can be either treated in a combustible gas treatment plant or recycled via a recirculation pump 59 to the aromatization catalyst chamber. In another embodiment, the combustible gas mixture 42 may be recycled to one or more of the following: (a) at least one or more of the processing stations 50, (b) the dehydration catalyst 60, (c) the aromatization catalyst 61, and the (d) gas-upgrading catalyst 62.

Figure 3:
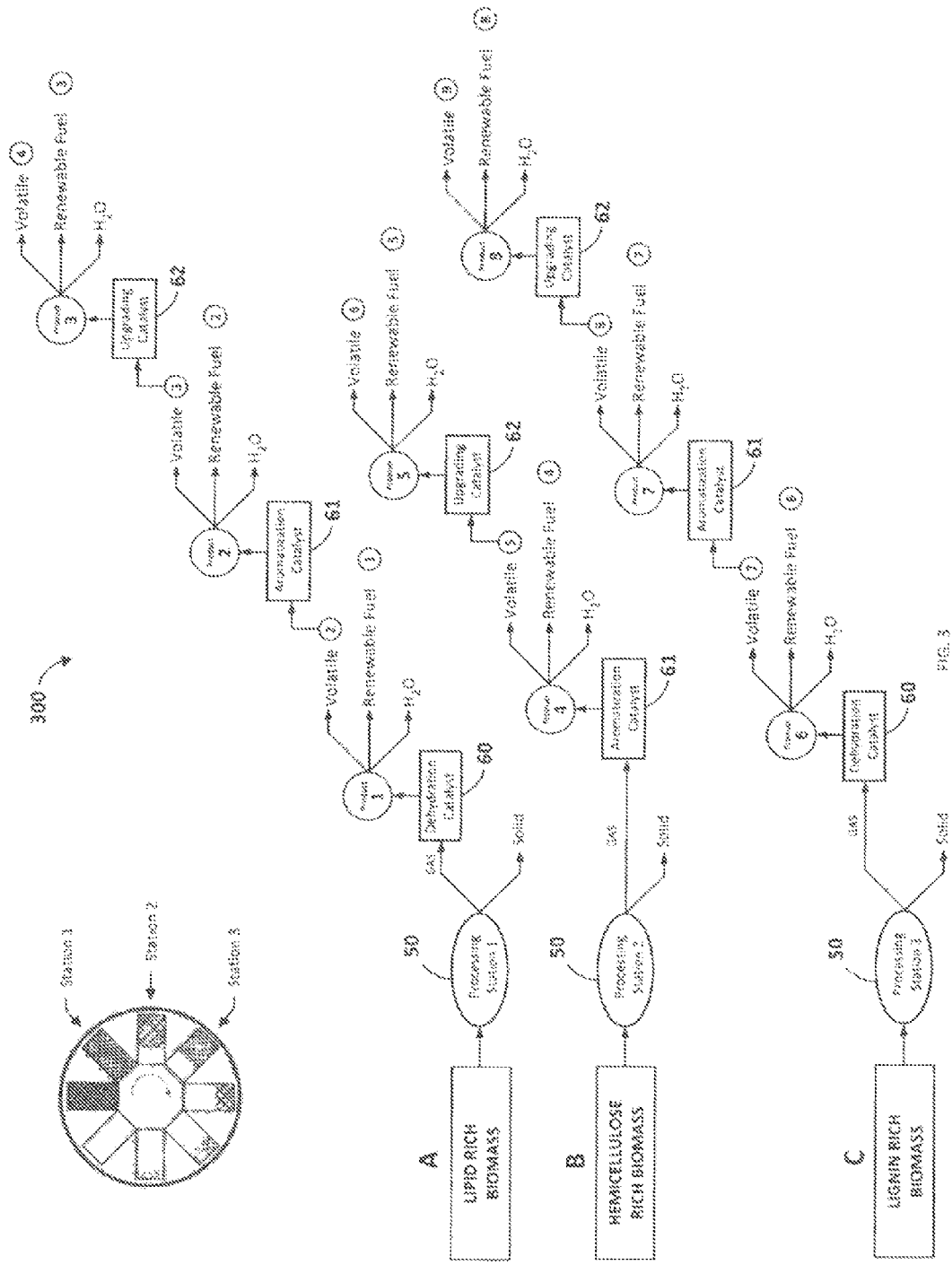
FIG. 3 is a more detailed flow diagram of the programmable catalyst chain of FIG. 2, in accordance with the principles of the invention.

FIG. 3 shows an embodiment 300 of the present invention using knowledge of the initial composition of the biomass for converting various types of biomass feedstocks with three processing stations 50 and an array of catalytic columns for optimal product yield. The biomass feedstocks in various stations can come from a single biomass input which are subsequently processed using the three stations, or from multiple independent biomass inputs. While the number of processing stations can vary, the same catalytic columns are used to convert the volatile gases to renewable fuels. The order in which the catalytic columns are selected can vary.

Station 1 when fed with a lipid rich biomass (A) produces a product comprising a volatile gas and a carbonaceous solid. Station 1 preferably operates at less than 300° C. The volatile components are passed through a dehydration catalyst 60 to produce a first product. This first product is cooled using a room temperature trap and is comprised of water, a first renewable fuel and a second volatile component. The first renewable fuel is then recovered. The dehydration catalyst operates at less than 2 bar pressure, preferably in the temperature range of 400-700° C., most preferably in the range of 400° C. to 500° C.

The dehydration catalyst 60 can be any acid catalyst. Suitable acid catalysts for the present invention are heterogeneous (or solid) acid catalysts. The at least one solid acid catalyst may be supported on at least one catalyst support (herein referred to as a supported acid catalyst). Solid acid catalysts include, but are not limited to, (1) heterogeneous heteropolyacids (HPAs) and their salts, (2) natural clay minerals, such as those containing alumina or silica (including zeolites), (3) cation exchange resins, (4) metal oxides, (5) mixed metal oxides, (6) inorganic acids or metal salts derived from these acids such as metal sulfides, metal sulfates, metal sulfonates, metal nitrates, metal phosphates, metal phosphonates, metal molybdates, metal tungstates, metal borates, and (7) combinations of groups 1 to 6.

Suitable HPAs include compounds of the general Formula $X_a M_b, O_c^{q-}$, where X is a heteroatom such as phosphorus, silicon, boron, aluminum, germanium, titanium, zirconium, cerium, cobalt or chromium, M is at least one transition metal such as tungsten, molybdenum, niobium, vanadium, or tantalum, and q, a, b, and c are individually selected whole numbers or fractions thereof. Methods for preparing HPAs are well known in the art. Natural clay minerals are well known in the art and include, without limitation, kaolinite, bentonite, attapulgite, montmorillonite and zeolites. Suitable cation exchange resins are styrene-divinylbenzene copolymer-based strong cation exchange resins such as Amberlyst® (Rohm & Haas; Philadelphia, Pa.), Dowex® (for example, Dowex® Monosphere M-31) (Dow; Midland, Mich.), CG resins from Resintech, Inc. (West Berlin, N.J.), and Lewatit resins such as MonoPlus™ S 100 H from Sybron Chemicals Inc. (Birmingham, N.J.). When present, the metal components of groups 4 to 6 may be selected from elements from Groups I, IIa, IIIa, VIIa, VIIIa, Ib and IIb of the Periodic Table of the Elements, as well as aluminum, chromium, tin, titanium and zirconium. Fluorinated sulfonic acid polymers can also be used as solid acid catalysts for the process of the present invention.

The second volatile component is then routed to an aromatization catalyst 61 to produce a second product. This second product in turn is cooled using a cold trap at 0-20° C., more preferably at 0-5° C. The output from the cold trap is comprised of water, a second renewable fuel and a third volatile component. The second renewable fuel is then recovered. The aromatization catalyst 61 is operated at less than 2 bar pressure, preferably in the temperature range of 300° C. to 500° C., most preferably in the range of 325° C. to 400° C. The aromatization catalyst 61 can be comprised of MFI type zeolites and metal modified MFI type zeolites, where the metal is selected from the group consisting of: Group VIB metals, Group VIIB metals, Group VIII metals, Group IB metals, Group IIB metals, Ga, In, and all combinations thereof.

The third volatile component is then routed to a gas-upgrading catalyst 62 to produce a third product. This third product in turn is cooled using a cold trap at 0-20° C., more preferably at 0-5° C. The output from the cold trap is comprised of water, a third renewable fuel and a fourth volatile component. The third renewable fuel is then recovered. The gas-upgrading catalyst 62 is operated at less than 2 bar pressure and preferably in the temperature range of 400° C. to 700° C., most preferably in the range of 500° C. to 600° C. The gas-upgrading catalyst 62 can be comprised of metal modified MFI type zeolites, where the metal is selected from the group consisting of: Ga, Zn, In, Mo, W, Cr, Pt, Pd, Rh, Ru, Au, Ir, and combinations thereof. The fourth volatile component can be recirculated to at least one of the following: a) one or more processing stations 50, b) the dehydration catalyst 60, c) the aromatization catalyst 61, d) the gas-upgrading catalyst 62, and e) a combustible gas treatment plant.

Referring still to FIG. 3, Station 2 can comprise a hemicellulose rich biomass (B) derived from another biomass feedstock or a carbonaceous solid from a previous station 50 that contains volatile components that did not volatilize in the prior station. Station 2 preferably operates at greater than 300° C. and less than 500° C. The temperature in Station 2 can be programmably incremented (ΔT) by the operator. The temperature increment can preferably be in the range of 10-200° C. Station 2 produces a product which is comprised of a volatile component and a carbonaceous solid that is different than the carbonaceous solid produced in the previous station. The volatile component produced in Station 2 is then routed through the aromatization catalyst 61 to produce a fourth product. This fourth product is then cooled using a cold trap at 0-20° C., most preferably at 0-5° C. The fourth renewable fuel is then recovered. The output from the cold trap is comprised of water, a fourth renewable fuel and a fifth volatile component. The aromatization catalyst 61 is operated at less than 2 bar pressure and preferably in the temperature range of 300° C. to 500° C., most preferably in the range of 325° C. to 400° C.

The fifth volatile component is then routed to the gas-upgrading catalyst 62 to produce a fifth product. This fifth product in turn is cooled using a cold trap at 0-20° C., most preferably at 0-5° C. The output from the cold trap is comprised of water, a fifth renewable fuel and a sixth volatile component. The fifth renewable fuel is then recovered. The gas-upgrading catalyst 62 is operated at less than 2 bar pressure and preferably in the temperature range of 400° C. to 700° C., most preferably in the range of 500° C. to 600° C. The sixth volatile component can be recirculated to at least one of the following: a) one or more processing stations 50, b) the dehydration catalyst 60, c) the aromatization catalyst 61, d) the gas-upgrading catalyst 62, and e) a combustible gas treatment plant.

Still referring to FIG. 3, Station 3 operates at greater than 500° C. processing either an independent lignin-rich biomass feedstock or the leftover carbonaceous solid from the previous station. Station 3 produces a product which contains volatile gases and a different carbonaceous solid. These volatile components are passed through a dehydration catalyst 60 to produce a sixth product. This sixth product is cooled using a room temperature trap and is comprised of water, a sixth renewable fuel and a seventh volatile component. The sixth renewable fuel is then recovered. The dehydration catalyst 60 operates at less than 2 bar pressure and preferably in the temperature range of 400-700° C., most preferably in the range of 400° C. to 500° C. The dehydration catalyst 60 can be the same as described above.

The seventh volatile component is then routed to the previously described aromatization catalyst 61 to produce a seventh product. This seventh product in turn is cooled using a cold trap at 0-20° C., most preferably at 0-5° C. The output from the cold trap is comprised of water, a seventh renewable fuel and an eighth volatile component. The seventh renewable fuel is then recovered. The aromatization catalyst 61 is operated at less than 2 bar pressure and preferably in the temperature range of 300° C. to 500° C., most preferably in the range of 325° C. to 400° C.

The eighth volatile component is then routed to the previously described gas-upgrading catalyst 62 to produce an eighth product. This eighth product in turn is cooled using a cold trap at 0-20° C., most preferably at 0-5° C. The output from the cold trap is comprised of water, an eighth renewable fuel and a ninth volatile component. The eighth renewable fuel is then recovered. The gas-upgrading catalyst 62 is operated at less than 2 bar pressure and preferably in the temperature range of 400° C. to 700° C., most preferably in the range of 500° C. to 600° C. The ninth volatile component can be recirculated to at least one of the following: a) one or more processing stations 50, b) the dehydration catalyst 60, c) the aromatization catalyst 61, d) the gas-upgrading catalyst 62, and e) a combustible gas treatment plant.

The embodiment of FIG. 3 involves an approach that exploits knowing the initial composition of the biomass input, and then adjusting the routing of the decomposition products based on this initial composition. Accordingly, given a hemicellulose rich feedstock, it may be beneficial to set all of the processing stations 50 to a temperature greater than 300° C. Similarly, given a lignin-rich feedstock, it may be beneficial to operate all the processing stations 50 at temperatures greater than 500° C. Such an operation is expected to utilize all the stations in the most efficient manner for maximizing fuel output.

Figure 4:
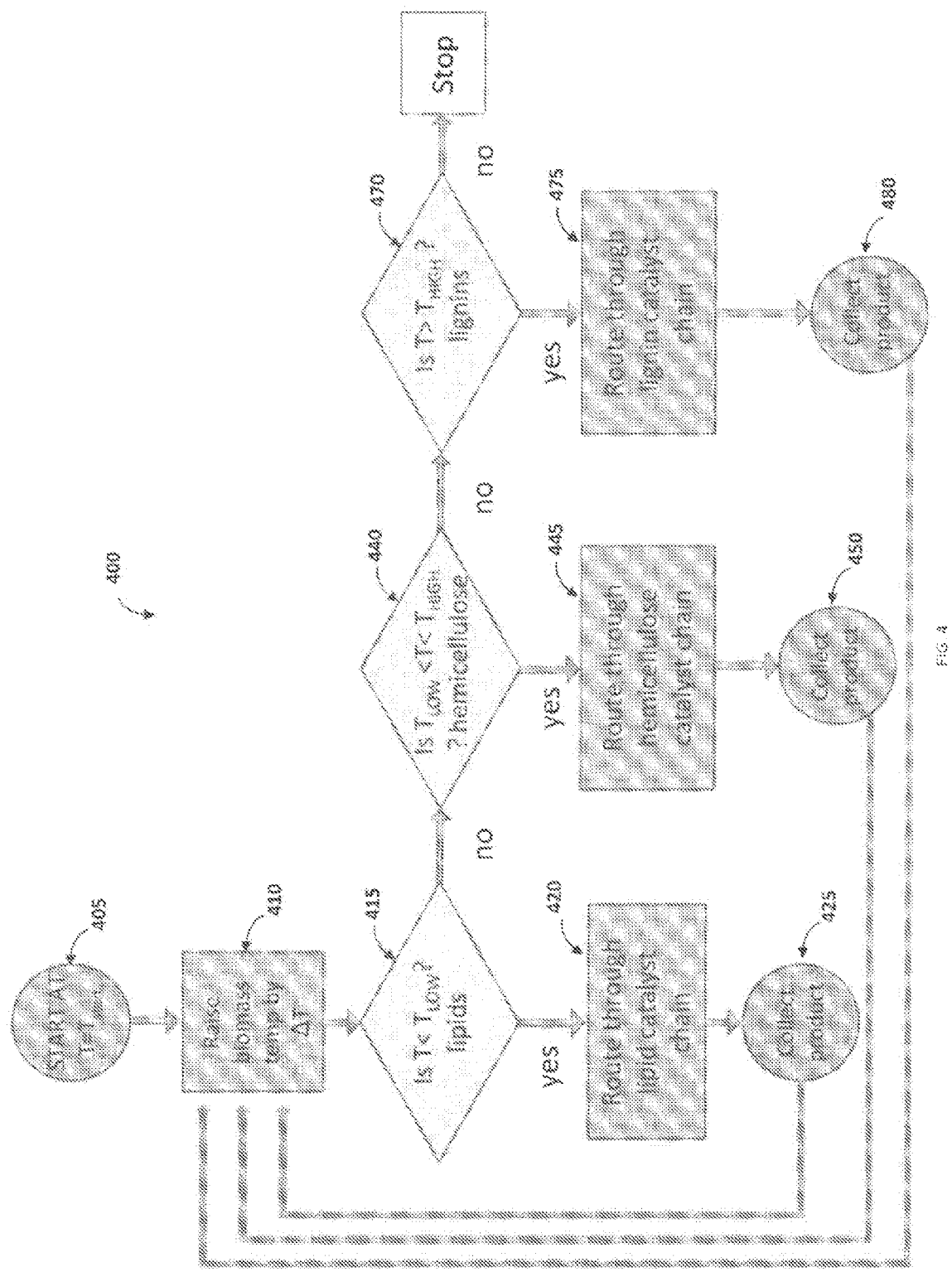
FIG. 4 is a flowchart depicting an algorithm that depends on incrementing the processing station temperature until a desired maximum temperature is reached, in accordance with the principles of the invention.

Another approach entails the use of an algorithm that raises an individual processing station temperature by $\Delta T$ until a desired end temperature is reached. This approach is illustrated in FIG. 4, which shows a temperature algorithm flowchart 400 for a single processing station. For three cuts derived from lipids, hemicellulose and lignins, one would select $T_{Low}$ around 300° C., and $T_{HIGH}$ around 500° C.

Referring to FIG. 4, $T=T_{start}$ at operation 405. Operation 410 involves raising the biomass temperature by $\Delta T$. Next, operation 415 involves determining whether $T<T_{Low}$ for the lipids. If so, the next steps entail routing the biomass through the lipid catalyst chain (operation 420), collecting the product (operation 425), and proceeding to raise the biomass temperature by $\Delta T$ (operation 410). If operation 415 is false, operation 440 involves determining whether $T_{Low}<T<T_{HIGH}$ for the hemicellulose. If so, the next steps include routing the biomass through the hemicellulose catalyst chain (operation 445), collecting the product (operation 450), and proceeding to raise the biomass temperature by $\Delta T$ (operation 410). If operation 440 is false, operation 470 involves determining whether $T>T_{HIGH}$ for the lignins. If so, the next steps entail routing the biomass through the lignin catalyst chain (operation 475), collecting the product (operation 480), and proceeding to raise the biomass temperature by $\Delta T$ (operation 410). The algorithm ends if operation 470 is false.

Figure 5:
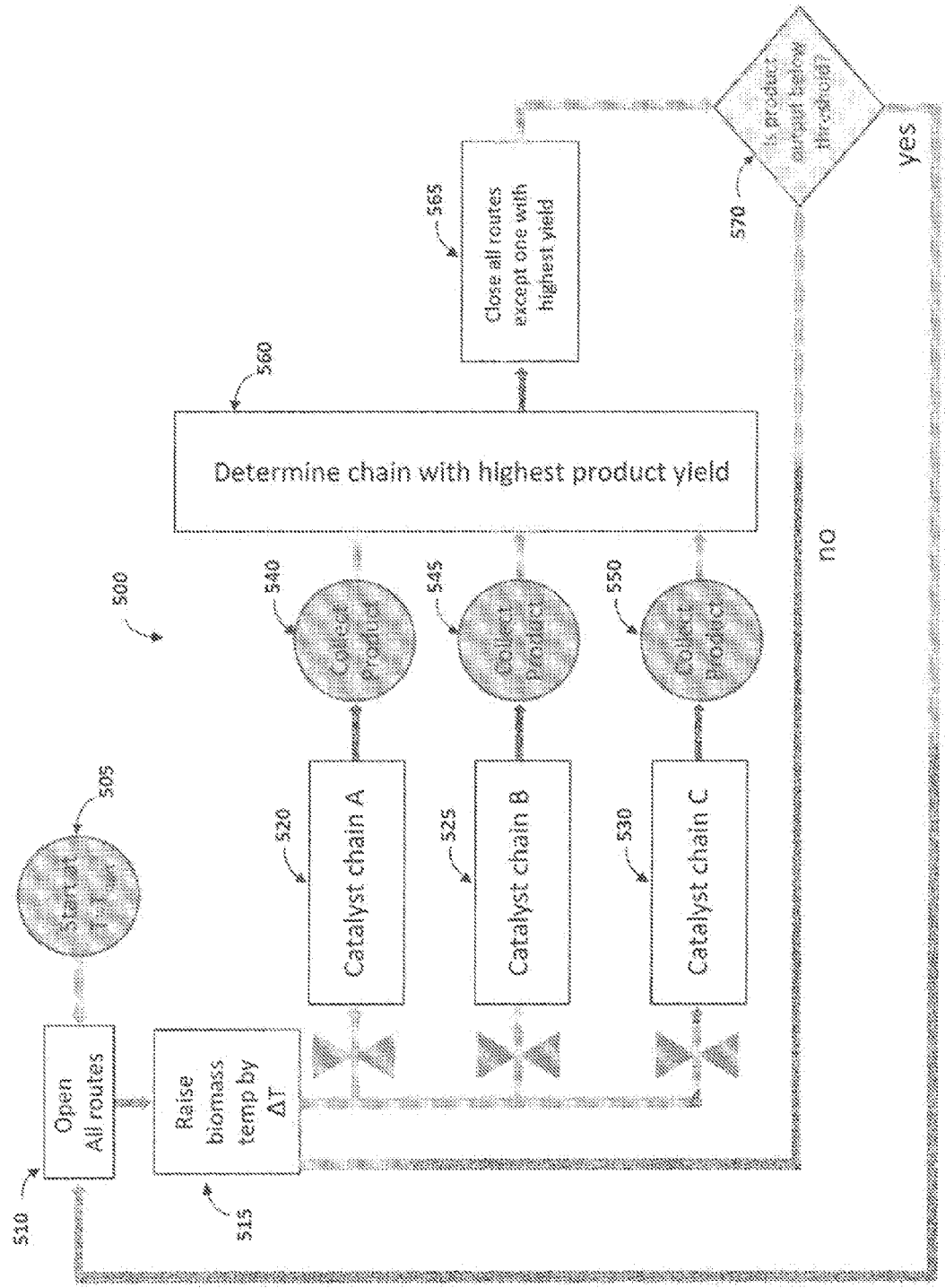
FIG. 5 is a flowchart depicting an algorithm that depends on balancing output from various catalyst chains, in accordance with the principles of the invention.

Yet another approach involves load balancing the output from each catalytic chain in order to maximize product yield. This approach is illustrated in FIG. 5, which depicts a load balancing algorithm flowchart 500 for one processing station. According to this approach, knowledge of composition is not required. Rather, the optimal catalytic route is determined by comparing product output yield from each route. Subsequently, the temperature is incremented until a final desired temperature is achieved.

Referring to FIG. 5, $T=T_{start}$ at operation 505. Operation 510 involves opening all routes. Next, operation 515 comprises raising the biomass temperature by $\Delta T$. At this point, this approach splits into three routes, specifically catalyst chain A (operation 520), catalyst chain B (operation 525), and catalyst chain C (operation 530). Product is collected for each catalyst chain in subsequent operations 540, 545, 550. Operation 560 entails determining the optimal catalytic route is calculated by comparing product output yield from each route and determining the catalyst chain having the highest product yield. Then, operation 565 comprises closing all routes except the one with the highest yield. Operation 570 involves determining whether the product output is below a threshold level. If so, the algorithm proceeds to open all routes (operation 510). If not, the algorithm proceeds to raise the biomass temperature by $\Delta T$ (operation 515).

Figure 8:
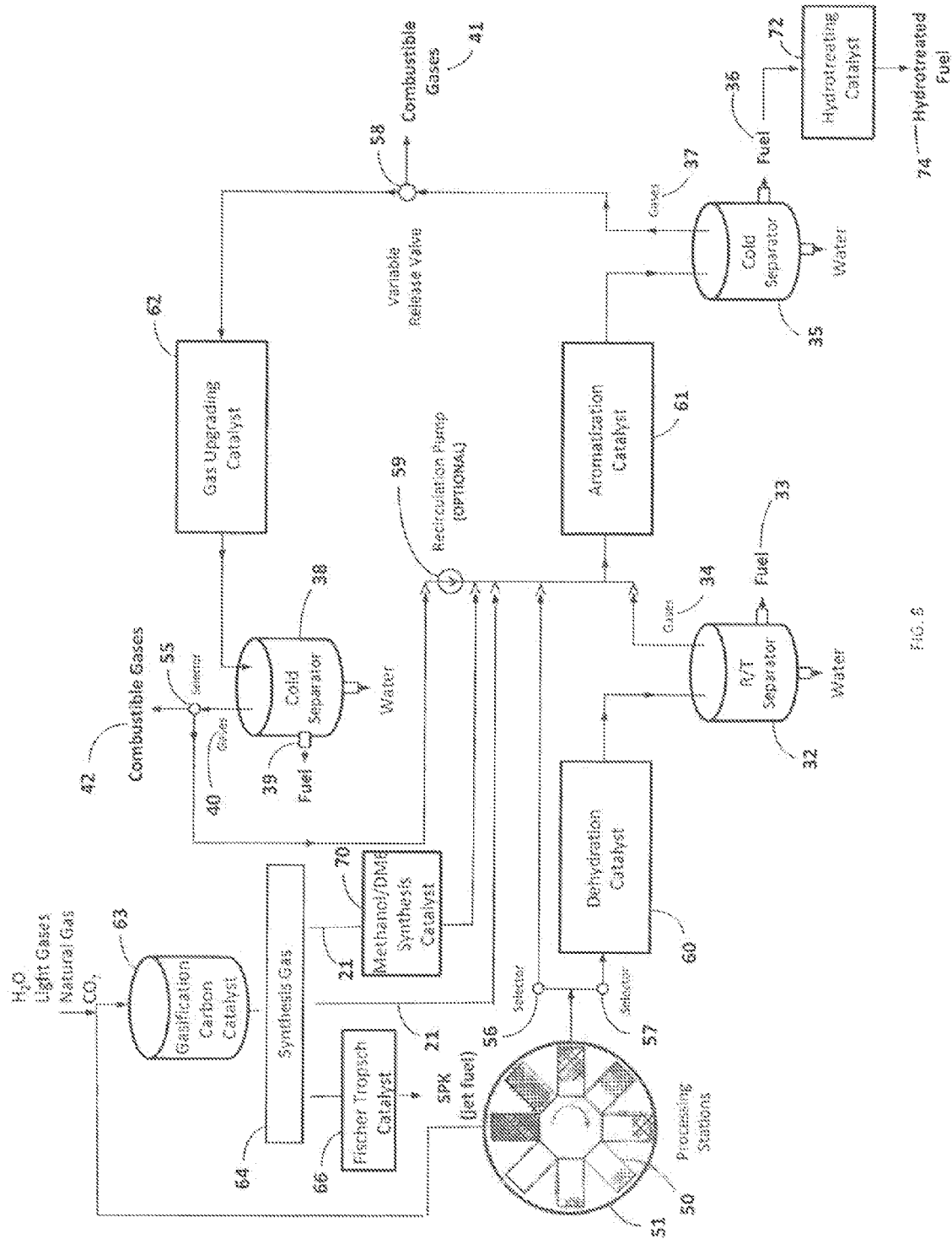
FIG. 8 is a flow diagram illustrating a programmable catalyst chain with seven stations (four optional), in accordance with the principles of the invention.

FIG. 8 depicts another embodiment of the present invention having eight processing stations 50 and a series of catalyst channels comprising a dehydration catalyst 60, an aromatization catalyst 61, and a gas-upgrading catalyst 62. The output from each catalytic array when cooled is comprised of volatile gases, renewable fuel and water. The volatile gases are then programmed to pass through subsequent catalytic columns. Depending on the temperature of the processing station 50 and the biomass composition, the volatile components from any given processing station can be channeled through one or more catalysts 60, 61, 62 using selector switches 55, 56, 57. Line 21 shows that an optional co-solvent may be added as an additional input to the aromatization catalyst 61. The co-solvent may be generated from a typical syngas converter (e.g., a gasification carbon catalyst) 64. Carbon monoxide and hydrogen for the syngas converter (to generate the co-solvent) may be obtained via well-known reactions with the leftover carbonaceous solid in a processing station 50. The co-solvent may comprise oxygenates such as aldehydes, alcohols, ketones, ethers, and carboxylates, as well as hydrocarbons.

A portion of the syngas generated by the syngas converter may optionally be directed to a synthetic paraffinic kerosene catalyst 66 (e.g., an appropriate Fischer-Tropsch catalyst) to generate synthetic paraffinic kerosene. Exemplary Fischer-Tropsch catalysts that may be used for synthetic paraffinic kerosene generation include Fe, Co, or Ru based Fischer-Tropsch catalysts. Such catalysts are typically operated at between about 150° C. to about 400° C.; with hydrogen to carbon monoxide ratios of between about 1:0.5 to about 1:5; and with operating pressures between about 100 psi to about 1000 psi. Additionally, a portion of the syngas generated by the syngas converter may optionally be directed to a methanol/DME synthesis catalyst 70 to enrich the co-solvent in methanol and/or dimethly ether. Any methanol/DME synthesis catalyst capable of generating lower alcohols such as methanol, ethanol, propanol, butanol or isobutanol may be used. In particular, catalyst systems capable of performing this function with a syngas feedstock may be used. Further, catalyst system capable of making ethers such as dimethyl ether, and/or corresponding ethers from their mixed alcohol may be used. Such catalysts, for example may be copper-based or ruthenium-based. Exemplary copper-based catalysts for methanol synthesis from syngas include, but not limited to catalysts comprising metals such as copper, zinc, alumina, manganese, and cesium. Exemplary catalysts for making higher alcohols include but are not limited to ruthenium on alumina. Additionally the catalyst may include a solid acid component such as alumina, silica-alumina, zeolites, sulfated zirconias, and heteropoly acids. An acid component in the catalyst conveniently helps the formation of ethers such as dimethylether, diethyl ether, etc. from their corresponding alcohols formed at the copper-based catalyst or the ruthenium-based catalyst.

If the volatile components from the processing station 50 are selected to go through a dehydration catalyst 60, then the output is passed through a room temperature separator 32, which separates the output into water, renewable fuel 33, and volatile gases 34.

The volatile gases 34 and optional co-solvent from line 21 are then routed through the aromatization catalyst 61 to produce a product that upon cooling with cold separator 35 gives water, renewable fuel 36 and volatile gases 37, which may include combustible gases 41. Renewable fuel 36 may optionally be directed to a hydrotreating catalyst 72, where a portion of the renewable fuel 36 is hydrogenated (e.g., a portion of aromatics may be converted to cycloparaffins). Hydrotreating catalysts typically include one or more metals supported on a high surface area inorganic carrier. The hydrotreating catalyst may include perovskite type materials and mixed metal oxide materials. Exemplary typical hydrotreating catalysts include a noble metal such as Pt or Pd supported on a high surface area inorganic carrier such as alumina or zeolites. In some instances it is preferred that the hydrotreating catalyst include one or more dopants, such as cerium and lanthanum, to stabilize the catalytic metal on the inorganic carrier. The hydrotreating catalyst system may also contain base metals such as Ni, Cu, Co, Mn, and Fe. Achieving hydrogenation with a hydrotreating catalyst typically occurs by subjecting the reactants to hydrogen gas at partial pressures of between about 100 to about 1000 psi in the temperature widow of about 100° C. to about 400° C. In some embodiments, the hydrotreating catalyst 72 may also remove or reduce the amount of one or contaminants, such as nitrogen, sulfur, oxygen, and one or more metals, in the resulting hydrotreated fuel 74. In some embodiments, at least about 70%, 80%, 90%, or more of one or more contaminants in the renewable fuel 36 are reduced by the hydrotreating catalyst 72.

Finally, as in previously discussed embodiments, combustible gases 41 from the aromatization catalyst 61 can be released via a variable release valve 58. The variable release valve can control the routing of the volatile gases 37 to either a gas-upgrading catalyst chamber, or a combustible gas treatment plant, or both. Upon cooling via cold separator 38, the product from the gas-upgrading catalyst 62 produces water, renewable fuel 39 and volatile gases 40, which may include combustible gas mixture 42. This combustible gas mixture can be either treated in a combustible gas treatment plant or recycled via a recirculation pump 59 to the aromatization catalyst chamber. In another embodiment, the combustible gas mixture 42 may be recycled to one or more of the following: (a) at least one or more of the processing stations 50, (b) the dehydration catalyst 60, (c) the aromatization catalyst 61, and the (d) gas-upgrading catalyst 62.

ILLUSTRATIVE EXAMPLE 1

Figure 6A:
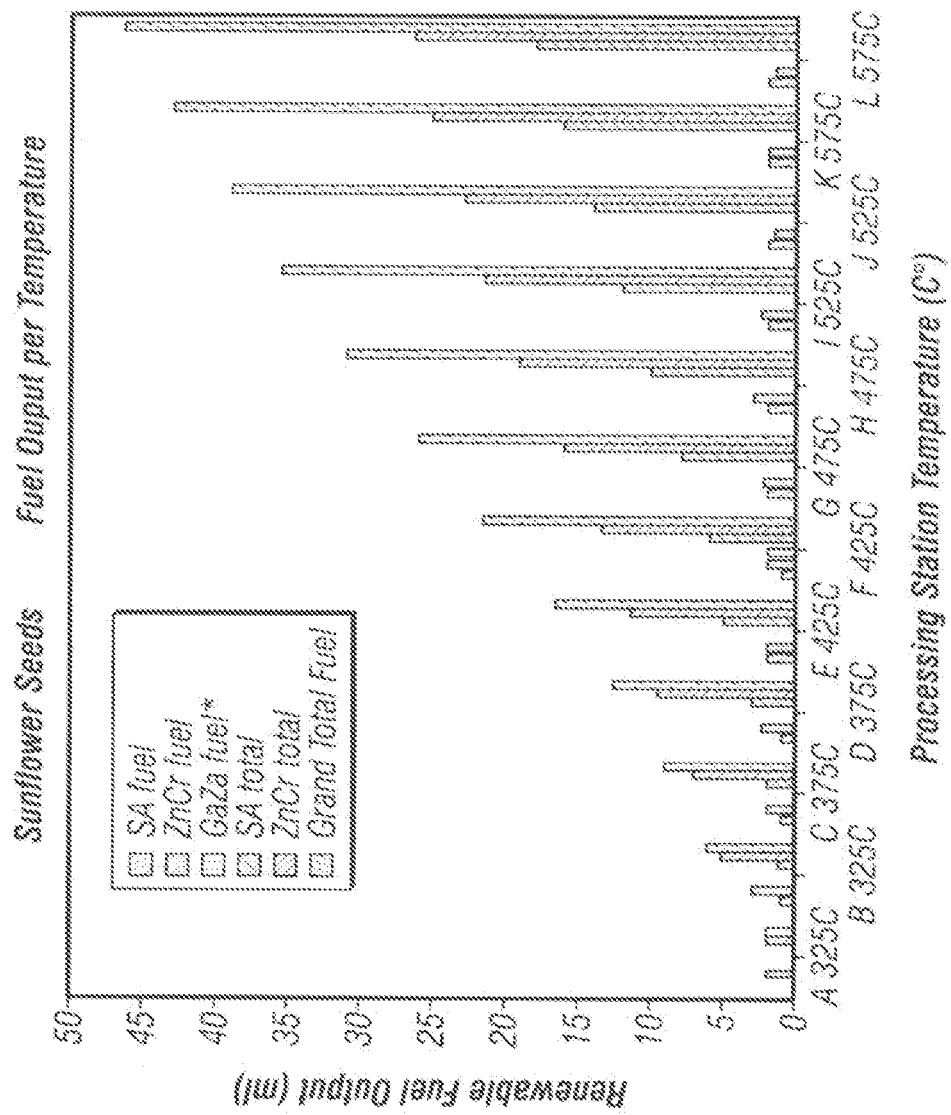
FIG. 6A is a plot of fuel output versus temperature for sunflower seeds using a dehydration catalyst, aromatization catalyst and gas-upgrading catalyst.

Referring now to FIG. 6A, this illustrative example is the equivalent to six processing stations 50 operating at six different temperatures wherein the input biomass is fed at 325° C. and the final carbonaceous solid is removed at 575° C. 150 g of biomass consisting of commercial sunflower seeds along with dimethyl ether as co-solvent were devolatilized starting at a temperature of 325° C. and ending at 575° C. with a temperature increment of 50° C. for every hour. 131 g of methanol was passed through a silica alumina catalyst to generate the required co-solvent. The output was passed through three different catalyst columns in series including a dehydration catalyst 60, an aromatization catalyst 61, and a gas-upgrading catalyst 62 as illustrated in FIG. 3 for cut A. More particularly, this experiment employed a silica alumina dehydration catalyst, a Zn and Cr modified ZSM-5 aromatization catalyst, and a Ga modified ZSM-5 gas-upgrading catalyst. FIG. 6A is a chart showing the fuel collected at each temperature for each catalyst at half-hour intervals. A grand total of 46.5 ml of renewable fuel is produced by the three catalysts by the end of the run, including: (i) a total of 26.5 ml of renewable fuel collected from the aromatization catalyst 61, (ii) a total of 18 ml of renewable fuel collected from the dehydration catalyst 60, and (iii) a total of 2 ml of renewable fuel collected from the gas-upgrading catalyst 62.

Figure 6B:
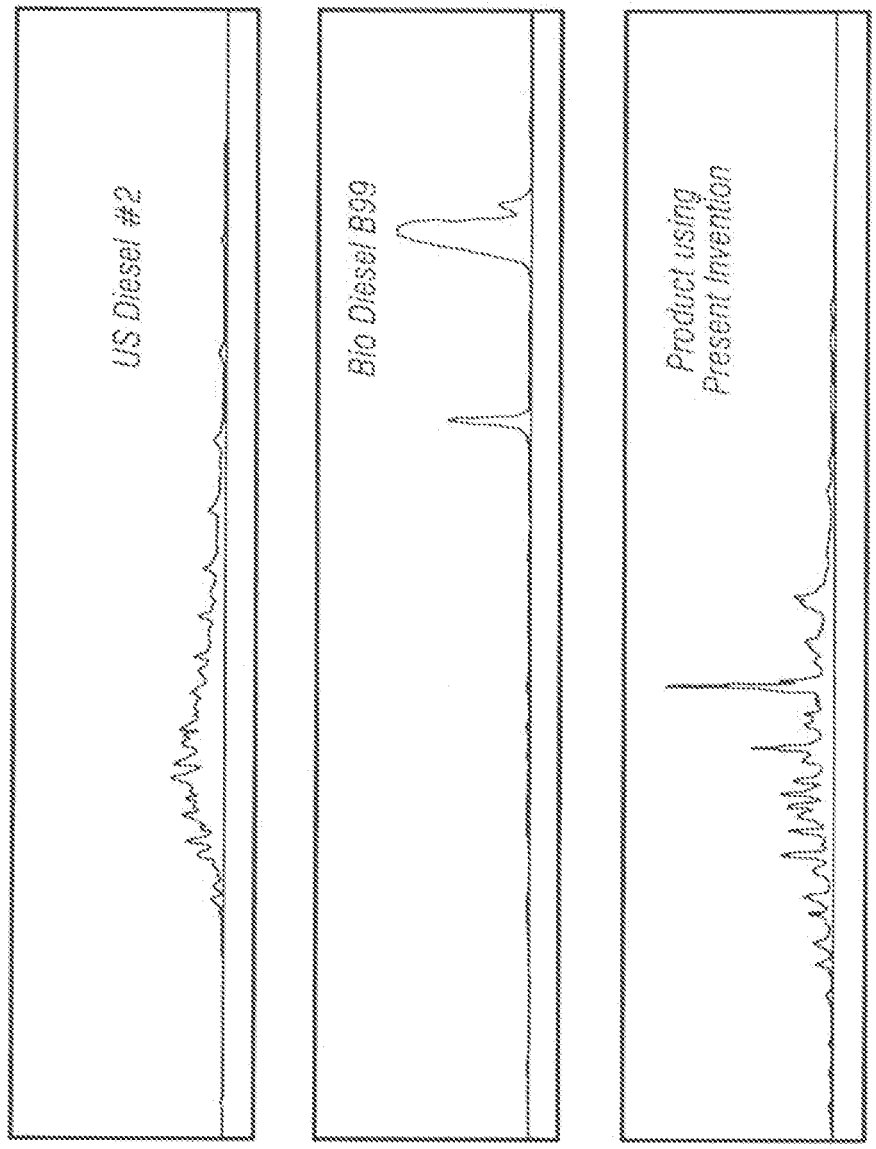
FIG. 6B shows a comparative output of the A cut (after dehydration catalyst) versus U.S. Diesel #2 and Biodiesel B99.
Figure 6C:
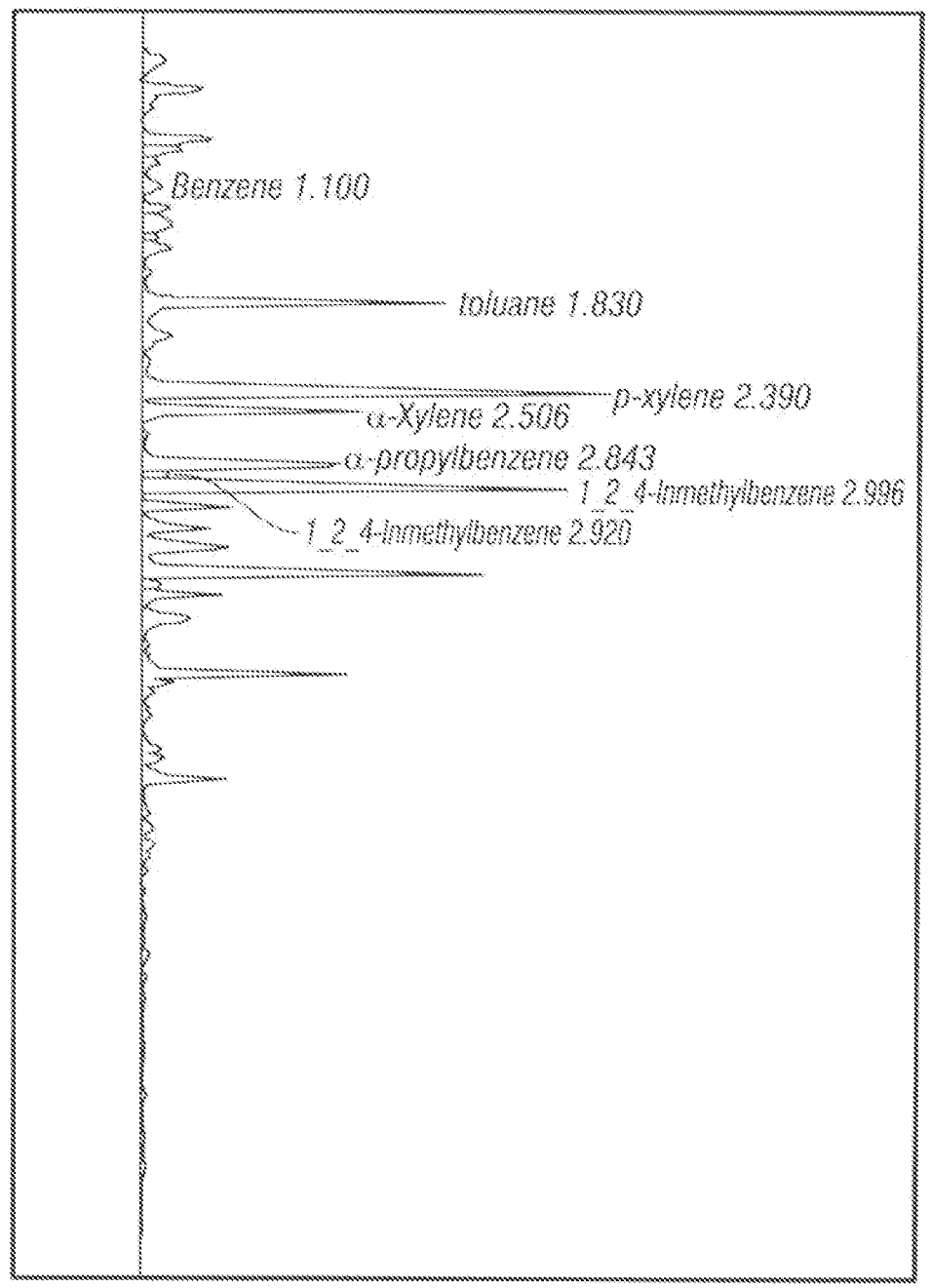
FIGS. 6C and 6D show gas chromatograms (GC) data for renewable fuels obtained after the aromatization catalyst and gas-upgrading catalyst.
Figure 6D:
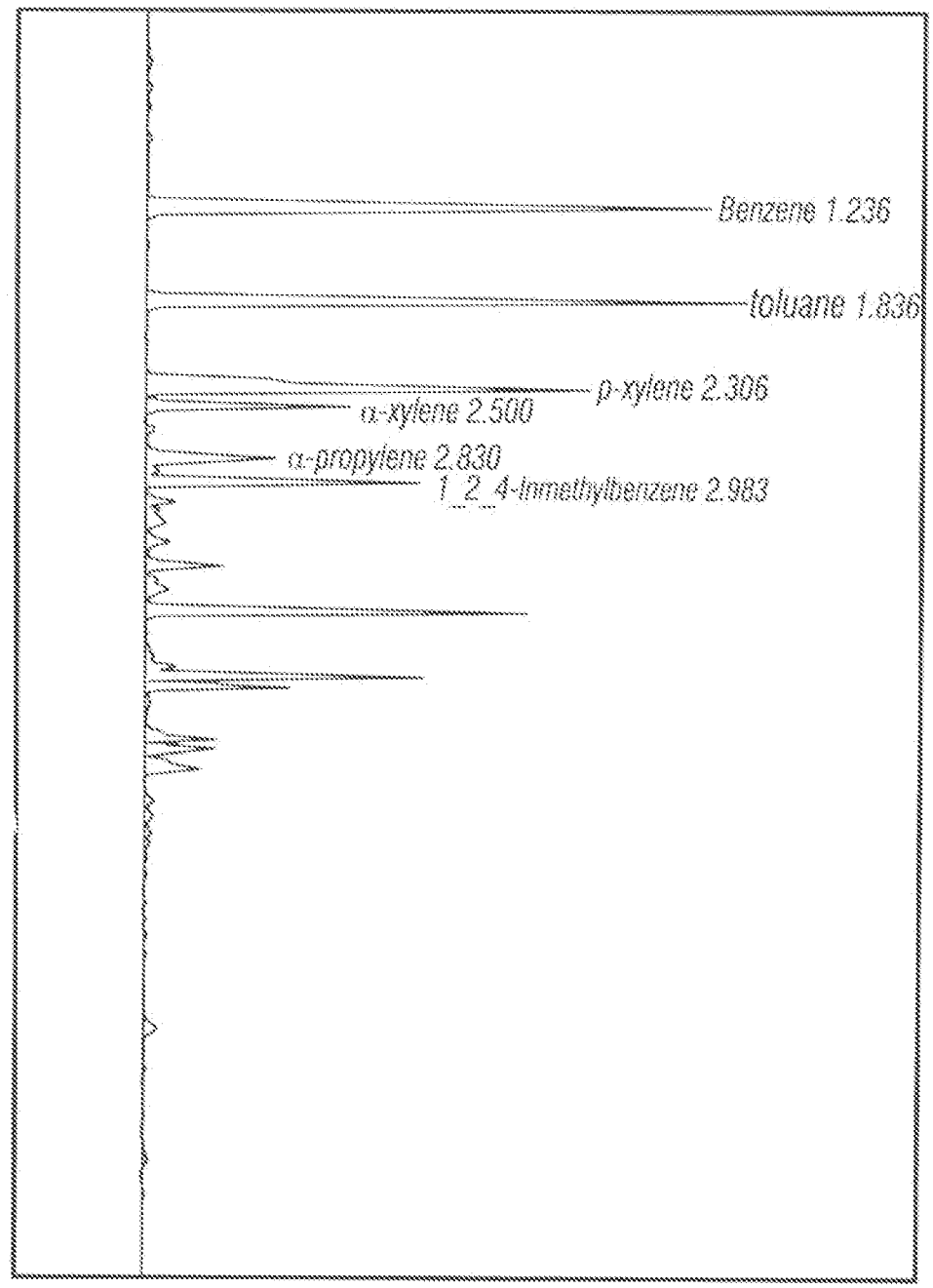

FIG. 6B is a chart showing the gas chromatogram profile of the renewable fuel collected from the dehydration catalyst 60 along with comparative charts of regular US Diesel #2 fuel and Bio Diesel B99 obtained from a commercial source. The renewable fuel produced from the dehydration catalyst according to the present invention is significantly different when compared to the Biodiesel B99 and more resembles the profile of the regular US Diesel #2. Gas chromatograms shown in FIGS. 6C and 6D represent renewable fuel composition from the aromatization catalyst 61 and the gas-upgrading catalyst 62, respectively. Significant amount of aromatic hydrocarbons are present in both renewable fuels.

ILLUSTRATIVE EXAMPLE 2

This illustrative example is the equivalent to six processing stations operating at six different temperatures wherein the input biomass is again fed at 325° C. and the final carbonaceous solid is removed at 525° C. 76 g of biomass consisting of commercial corn cobs along with 100 g of methanol were devolatilized starting at a temperature of 325° C. and ending at 525° C. with a temperature increment of 50° C. for every hour. This example assumes that corn cobs contain significant amounts of hemicellulose (C5 sugars), which may decompose in the presence of a dehydration catalyst 60, leading to more breakage of chemical bonds than necessary. Therefore, the output was passed through two different catalyst columns in series, one consisting of an aromatization catalyst 61, followed by a gas-upgrading catalyst 62 as illustrated in FIG. 3 for cut B. In this example, ZSM-5 was employed as the aromatization catalyst, and Ga modified ZSM-5 was employed as the gas-upgrading catalyst. A total of 29 ml of renewable fuel was collected by the end of the run from the aromatization catalyst, while a total of 5.5 ml of renewable fuel was collected from the gas-upgrading catalyst, Further analysis of the two renewable fuels collected indicated significant presence of aromatic compounds similar in composition as shown in Illustrative Example 1.

ILLUSTRATIVE EXAMPLE 3

Figure 7:
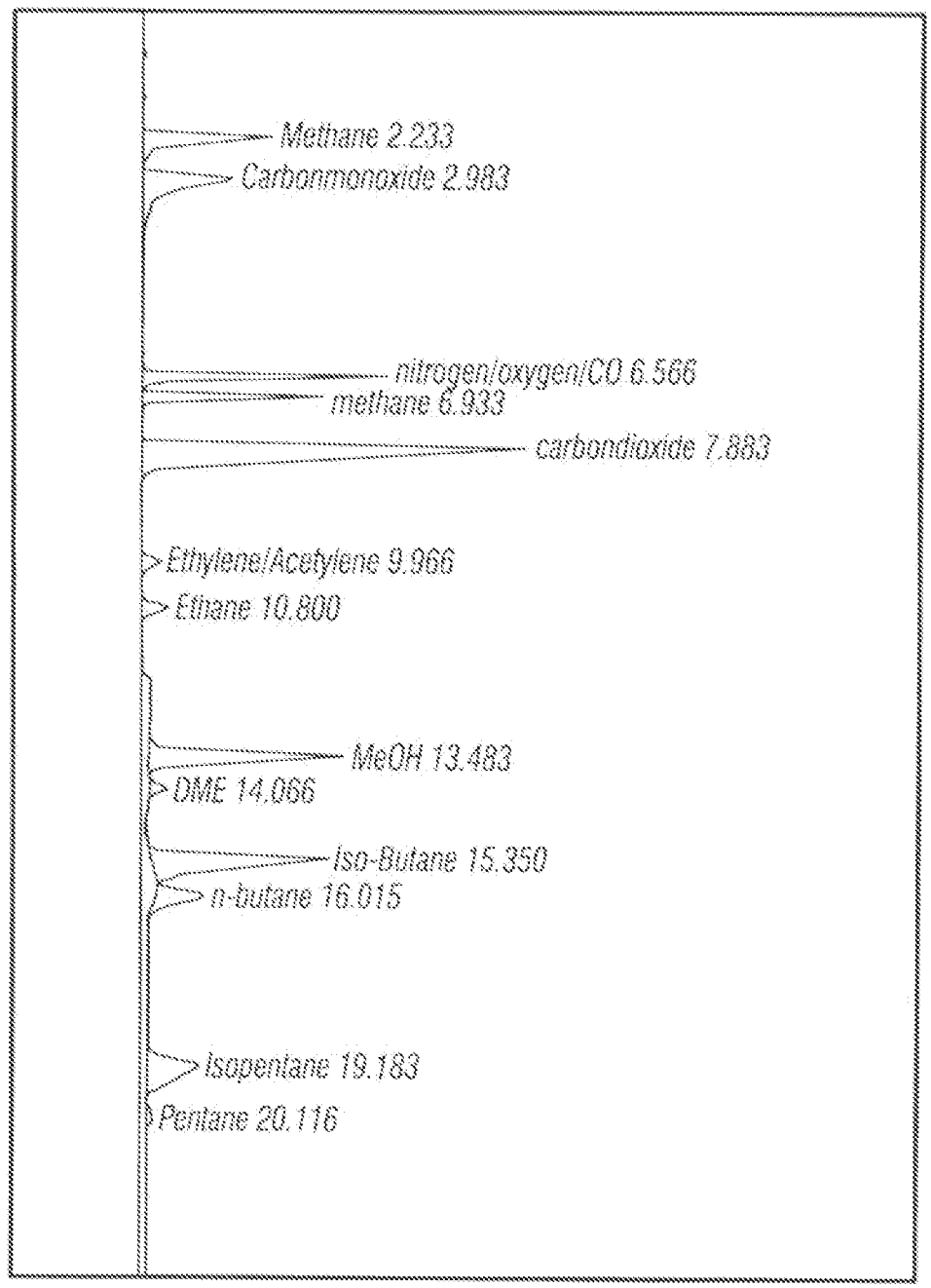
FIG. 7 is a GC plot of volatile gases collected after the aromatization catalyst using red fir as input biomass.

This illustrative example is the equivalent to six processing stations operating at six different temperatures wherein the input biomass is again fed at 325° C. and the final carbonaceous solid is removed at 575° C. 100 g of biomass consisting of red fir wood along with 131 g of methanol were devolatilized starting at a temperature of 325° C. and ending at 575° C. with a temperature increment of 50° C. for every hour. This example assumes that red fir contains significant amounts of lignins which are needed to be decomposed for efficient biomass conversion. The output was passed through two different catalyst columns in series, beginning with the dehydration catalyst 60, and followed by an aromatization catalyst 61. This experiment utilized silica alumina as the dehydration catalyst, and Zn and Cr modified ZSM-5 as the aromatization catalyst. A total of 30.5 ml of renewable fuel was collected by the end of the run from the aromatization catalyst 61, whereas a total of 1 ml of renewable fuel was collected from the dehydration catalyst 60. While the fuel from the silica alumina catalyst was diesel-like, the fuel from the aromatization catalyst had significant amounts of aromatic hydrocarbons. The volatile gases after the aromatization catalyst 61 had significant amounts of C1-C5 non-condensable hydrocarbons, as shown in FIG. 7.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. These illustrations and their accompanying description should not be construed as mandating a particular architecture or configuration.

The invention claimed is:

1. A system for the conversion of biomass to renewable fuel, comprising:
    a programmable number of processing stations (N) for subjecting biomass to at least one programmable starting temperature (Tstart) and for incrementing the temperature by programmable increments ($\Delta T$) to produce a volatile and a non-volatile component;
    a series of catalyst columns for receiving the volatile components generated in each station to produce at least one renewable fuel; and
    a hydrotreating catalyst to which the at least one renewable fuel is subjected to produce at least one hydrotreated renewable fuel.

2. The system of claim 1, wherein the hydrotreating catalyst comprises one or more metals supported on a high surface area inorganic carrier.

3. The system of claim 1, wherein the at least one renewable fuel is subjected to the hydrotreating catalyst at a temperature of between about 100° C. to about 400° C.

4. The system of claim 1, wherein the series of catalyst columns comprise catalysts for catalytic aromatization and catalytic gas-upgrading.

5. The system of claim 1, wherein the series of catalyst columns comprise catalysts for catalytic dehydration and catalytic gas-upgrading.

6. The system of claim 1, wherein the series of catalyst columns comprise catalysts for catalytic dehydration and catalytic aromatization.

7. The system of claim 1, wherein the processing station is further used for incrementing the non-volatile component temperature by $\Delta T$ to produce additional volatile and non-volatile components.

8. The system of claim 1, wherein N ranges from 2 to 1000, and wherein Tstart ranges from 100° C. to 1000° C.

9. The system of claim 1, wherein the temperature increment ($\Delta T$) ranges from 0° C. to 200° C., and wherein biomass moisture content is less than 15%.

10. The system of claim 9, wherein biomass is ground to a particle size between 1/16 inch and 1 inch.

11. The system of claim 1, wherein a co-solvent is added to volatile components or added to at least one of the processing stations, wherein the co-solvent is selected from the group consisting of alcohols, aldehydes, ketones, ethers, carboxylic acids, and hydrocarbons, and wherein generation of the co-solvent comprises treatment of the non-volatile component with a syngas conversion catalyst to generate syngas.

12. The system of claim 11, wherein generation of the co-solvent further comprises treatment of the syngas with a methanol/dimethyl ether synthesis catalyst.

13. The system of claim 11, further comprising a Fischer-Tropsch catalyst, wherein a portion of the syngas is subjected to the Fischer-Tropsch catalyst to generate synthetic paraffinic kerosene.

14. The system of claim 1, wherein the biomass is selected from the group consisting of lipids, hemicellulose, cellulose and lignins.

15. The system of claim 14, wherein Tstart is below 300° C. for biomass composition comprising 20-80% lipids, wherein Tstart is in the range of 300-500° C. for biomass comprising 20-80% hemicellulose, and wherein Tstart is greater than 500° C. for biomass composition comprising 20-80% lignins.

16. The system of claim 14, wherein Tstart is selected according to the highest biomass compositional component selected from the groups consisting of lipids, hemicellulose and lignins.

17. The system of claim 1, wherein all processing stations are set at the same Tstart.

18. The system of claim 1, wherein the non-volatile component is thermally conductive.

19. A system for the conversion of biomass to renewable fuel, comprising:
    a programmable number of processing stations (N) for subjecting biomass to at least one programmable starting temperature (Tstart) and for incrementing the temperature by programmable increments ($\Delta T$) to produce a volatile and a non-volatile component;
    a series of catalyst columns for receiving the volatile components generated in each station to produce at least one renewable fuel;
    a syngas conversion catalyst; and
    a methanol/dimethyl ether synthesis catalyst;
    wherein a co-solvent is added to volatile components or added to at least one of the processing stations, wherein the co-solvent is selected from the group consisting of alcohols, aldehydes, ketones, ethers, carboxylic acids, and hydrocarbons, and wherein the co-solvent is generated via treatment of the non-volatile component with the syngas conversion catalyst to generate syngas and subsequent treatment of a portion of the syngas with the methanol/dimethyl ether synthesis catalyst.

20. The system of claim 19, wherein the methanol/dimethyl ether synthesis catalyst comprises a catalyst capable of generating one or more lower alcohols selected from the group consisting of methanol, ethanol, propanol, butanol and isobutanol from a syngas feedstock.

21. The system of claim 19, wherein the methanol/dimethyl ether synthesis catalyst comprises copper, ruthenium, or both.

22. The system of claim 21, wherein the methanol/dimethyl ether synthesis catalyst further comprises a solid acid component selected from the group consisting of alumina, silica-alumina, zeolites, sulfated zirconias, and heteropoly acids.

23. The system of claim 19, further comprising a Fischer-Tropsch catalyst, wherein a portion of the syngas is subjected to the Fischer-Tropsch catalyst to generate synthetic paraffinic kerosene.

24. A system for the conversion of biomass to renewable fuel, comprising:
   a programmable number of processing stations (N) for subjecting biomass to at least one programmable starting temperature (Tstart) and for incrementing the temperature by programmable increments ($\Delta T$) to produce a volatile and a non-volatile component;
   a series of catalyst columns for receiving the volatile components generated in each station to produce at least one renewable fuel;
   a syngas conversion catalyst; and
   a Fischer-Tropsch catalyst; wherein the syngas conversion catalyst is used to convert a portion of the non-volatile component to syngas, and wherein a portion of the resulting syngas is subjected to the Fischer-Tropsch catalyst to generate synthetic paraffinic kerosene.

25. The system of claim 24, wherein the Fischer-Tropsch catalyst comprises one or more selected from the group consisting of iron, cobalt, and ruthenium.

26. The system of claim 24, wherein a portion of the resulting syngas is subjected to the Fischer-Tropsch catalyst at a temperature of between about 150° C. and about 400° C.

27. The system of claim 24, wherein a portion of the resulting syngas is subjected to the Fischer-Tropsch catalyst at a pressure of between about 100 psi and about 1000 psi.

28. The system of claim 24, wherein the portion of the resulting syngas subjected to the Fischer-Tropsch catalyst comprises hydrogen and carbon monoxide at a ratio of between about 1:0.5 to about 1:5.

* * * * *